May 22, 1956 W. V. KING 2,746,641
BEVERAGE DISPENSING MACHINES
Filed May 27, 1950 3 Sheets-Sheet 1

INVENTOR.
WILLIAM V. KING
BY
Morgan, Finnegan + Durham
ATTORNEYS.

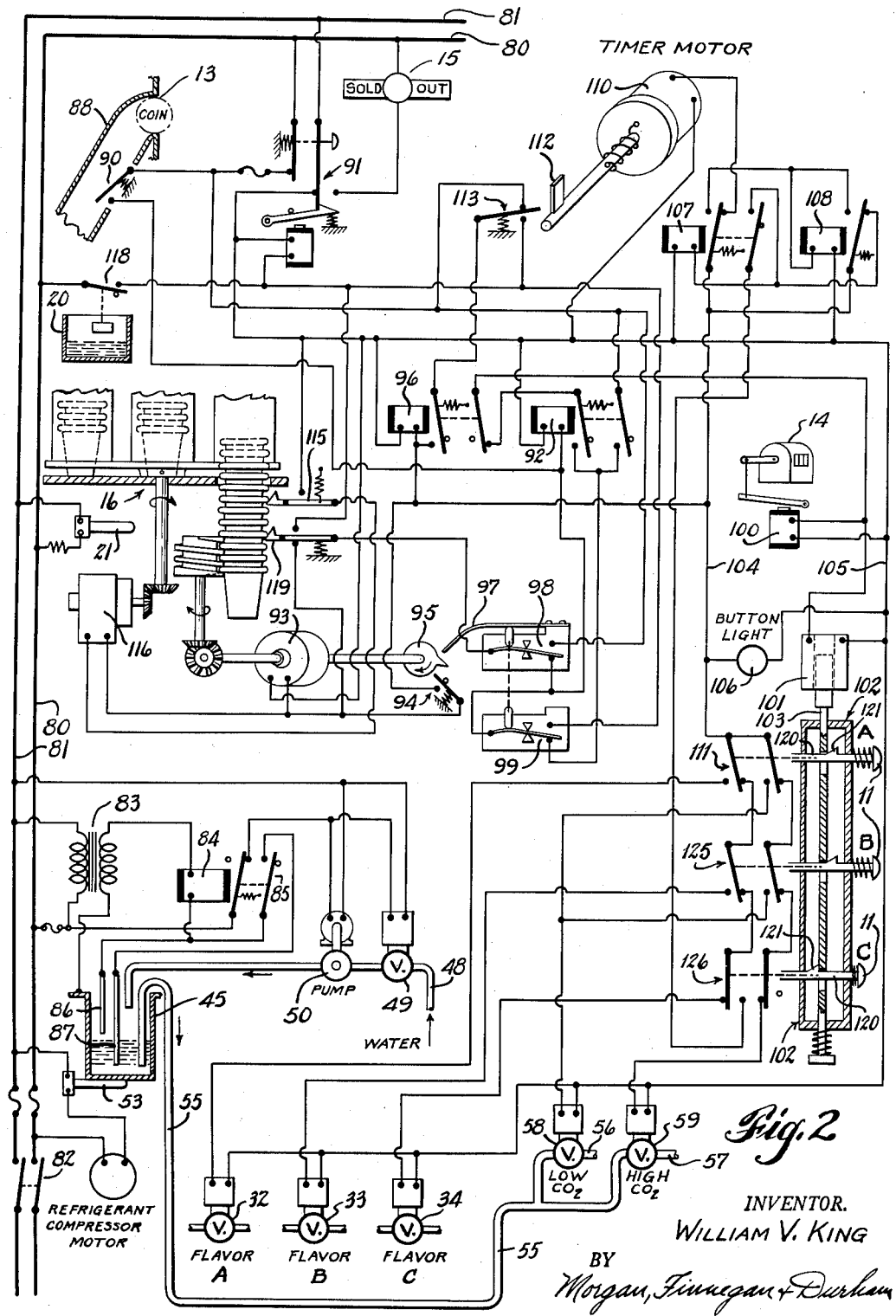

May 22, 1956 W. V. KING 2,746,641
BEVERAGE DISPENSING MACHINES
Filed May 27, 1950 3 Sheets-Sheet 3
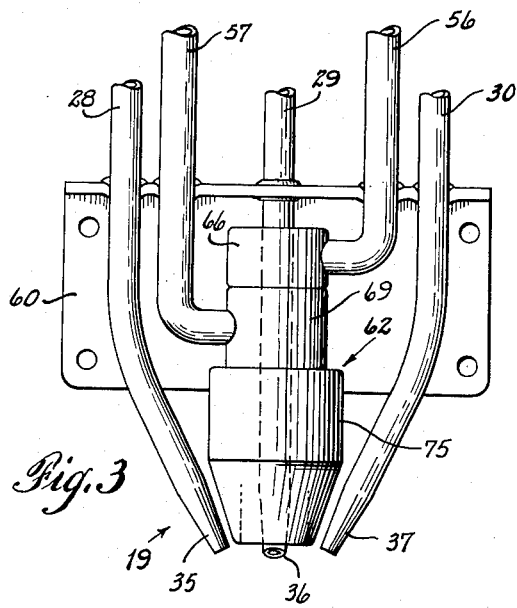
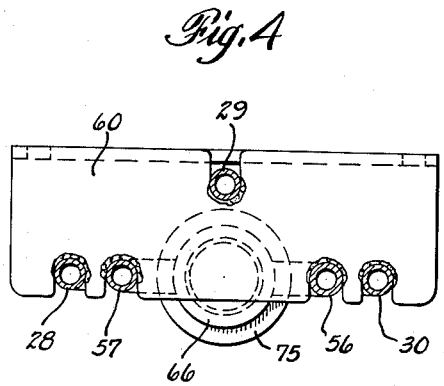
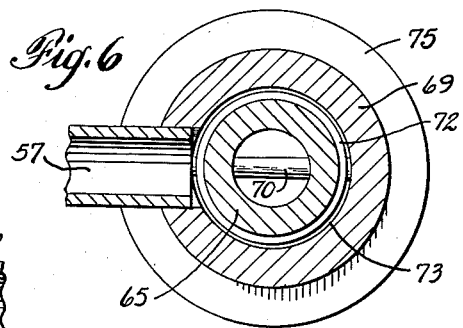
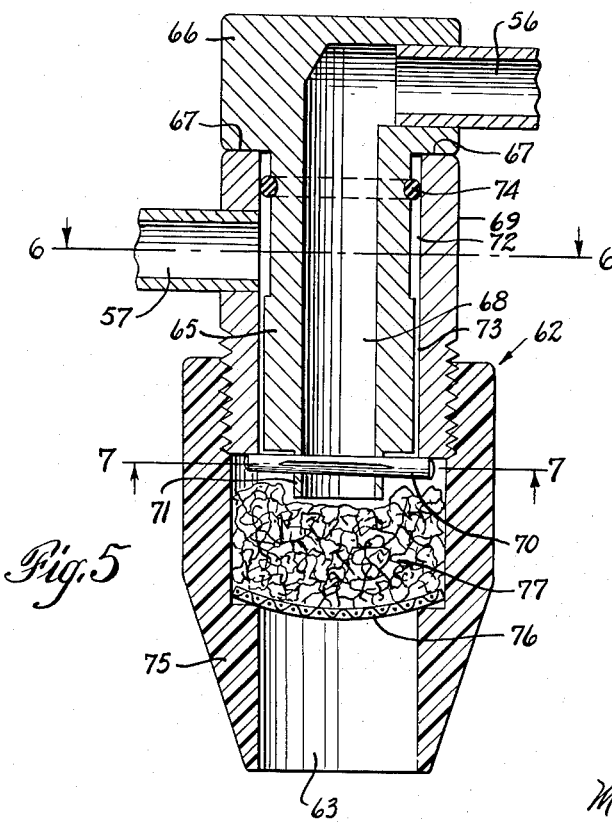
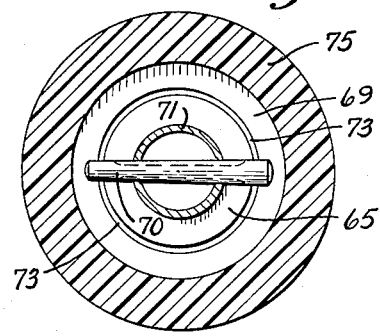
INVENTOR.
WILLIAM V. KING
BY
Morgan, Finnegan + Durham
ATTORNEYS.

United States Patent Office 2,746,641
Patented May 22, 1956

2,746,641

BEVERAGE DISPENSING MACHINES

William V. King, Brooklyn, N. Y., assignor, by mesne assignments, to Rowe Spacarb, Inc., New York, N. Y., a corporation of New York Application May 27, 1950, Serial No. 164,805

11 Claims. (Cl. 222—2)

The present invention relates to beverage dispensing machines of the cup dispensing type. Such machines, usually coin released, are commercially used to automatically dispense a beverage to a customer in a cup also automatically discharged from the machine. The invention relates to a machine of this type adapted to dispense a plurality of different beverages at the selection of the customer, each beverage comprising a mixture of carbonated water and a flavor or syrup therein. The invention provides means for dispensing a plurality of such carbonated drinks with varying degrees or points of carbonation, so that the optimum or most desired point of carbonation for each drink may be achieved or at least more nearly approached than has heretofore been possible.

In the mixing of carbonated drinks various flavors require different degrees or points of carbonation in the water used to provide the most palatable drink. Some drinks such as the cola drinks, ginger ale, and the like require a relatively high degree of carbonation in the water used in order to provide a beverage which the public finds acceptable, and any lesser degree of carbonation gives a flat and unpalatable drink. Other carbonated beverages, such as fruit drinks, root beer, cold chocolate, for instance, require a relatively lower degree of carbonated water mixed with the drink flavor in order to provide the best drink. A higher degree of carbonation in the water used provides a drink that is too "sharp," or one in which the flavor is wholly or largely obscured by the carbonated water.

The degree of carbonation in carbonated water is usually stated as volumes of the $CO_2$ gas mixed in water, and, as is well known, the capacity of the water to absorb the gas increases as the pressure is increased and the temperature is decreased. The unit of measure used as a standard for stating the point or degree of carbonation is "the volume," and one volume is the amount of gas that water will absorb at atmospheric pressure and at 60° F. Under these conditions a volume of gas occupies the same space as does the water by which it is absorbed.

As examples of the variation in the degree of carbonation of the water which will provide a desirable drink for a customer, it may be said that the degree of carbonation in water used for the cola drinks, ginger ale, and the like should be on the order of 3.5 to 3.8 volumes, while the degree of carbonation for fruit drinks, root beer, cold chocolate, and the like should be on the order of 2 to 2.7 volumes. The values stated are not critical, and are herein set forth merely as examples of practices which have been found desirable by applicant in commercial practice.

It is accordingly an object of the present invention to provide a beverage dispensing machine in which drinks of the various types mentioned may be dispensed from the same machine and each may be mixed with carbonated water having a degree of carbonation which is desirable for the flavor or syrup used in the finally dispensed drink.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

Of the drawings:

Fig. 2 is a circuit diagram and further diagrammatic representation of the beverage dispensing machine shown in Fig. 1;

Fig. 3 is a rear elevation of a preferred form of the beverage dispensing faucet used in the machine shown in the preceding figures;

Fig. 4 is a top plan view of the faucet shown in Fig. 3;

Figure 1:
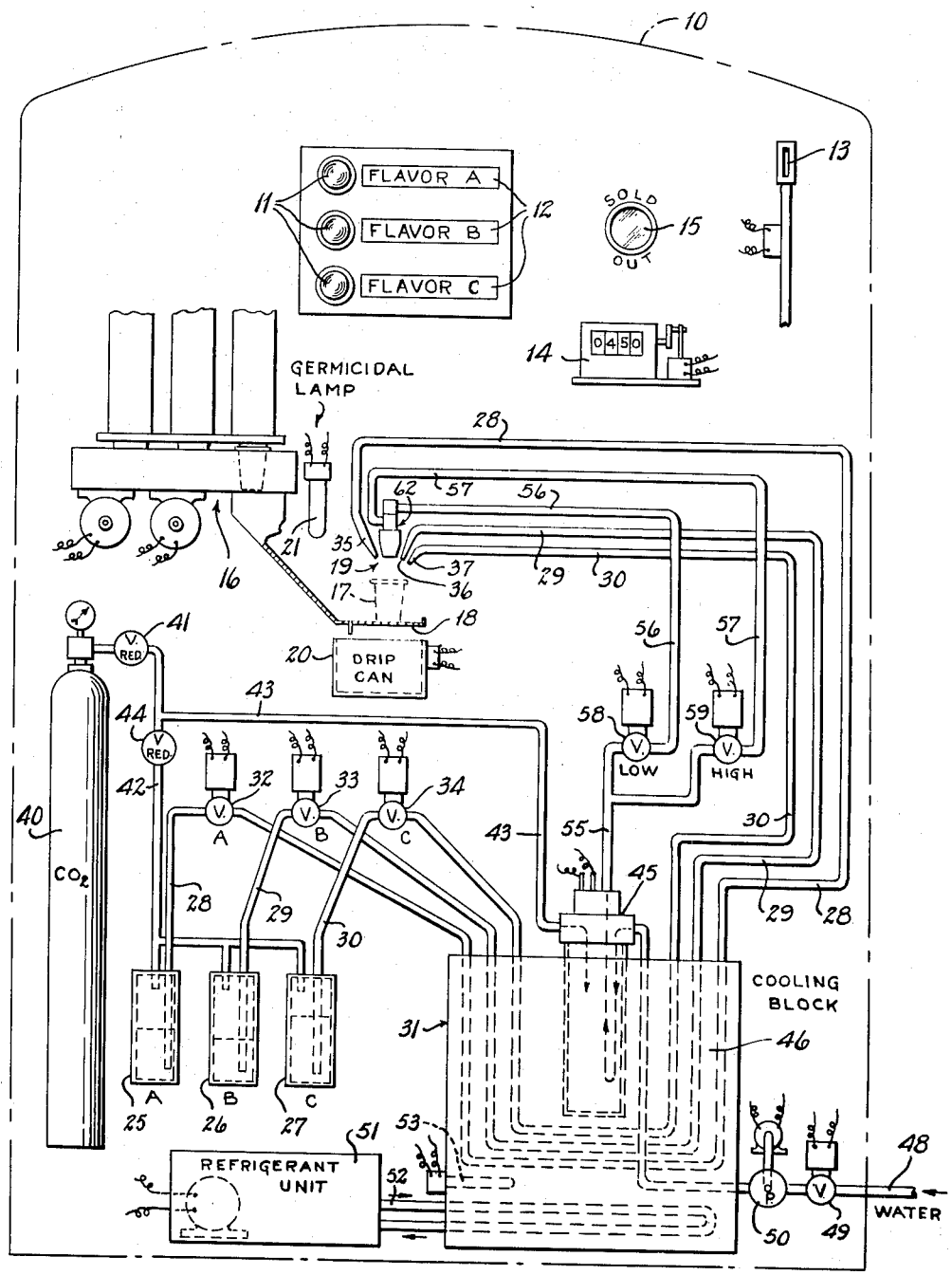
Fig. 1 is a diagrammatic representation of an automatic cup beverage dispensing machine wherein the invention is embodied.

Fig. 5 is a vertical, central cross-sectional view of the faucet shown in Fig. 3; and Figs. 6 and 7 are cross-sectional views of the faucet taken along lines 6—6 and 7—7 respectively of Fig. 5.

Referring now in detail to the illustrative embodiment of the invention shown by way of example in the accompanying drawings, the elements of a beverage vending machine embodying the present invention are shown diagrammatically in Fig. 1 of the drawings. The mechanism is preferably found in a suitable cabinet the outline of which is designated by the numeral 10 in the drawing. The particular machine illustrated is adapted to dispense three different carbonated drinks, and selection of the drink desired is under control of the customer by pressing one of the buttons 11 at the front panel of the machine, suitable legends 12 being provided stating what drinks are available. A coin opening 13 is also provided on the front panel to receive the customer's coin, after which the machine is in condition for selection of the drink by pressing one of the buttons 11, and automatic dispensing of the drink follows. A counting mechanism 14 is provided within the machine for showing the operator how many drinks have been vended, and a light 15 is positioned on the front panel to indicate to the customer whether or not the machine is capable of vending a drink.

Within the cabinet 10 is located the cup dispensing mechanism indicated generally by the numeral 16 in Fig. 1 and the circuit control, as hereinafter set out, is such that a cup 17 is dispensed after coin deposit and flavor selection have been accomplished and falls to a position on a platform 18, after which the selected beverage comprising carbonated water and flavor or syrup flow into the cup from the faucet, designated generally by the numeral 19. An overflow or drip can 20 is provided beneath platform 18 to receive accidentally dispended or spilled fluid, and means are provided for sanitary reasons for interrupting further operation of the machine when the drip can becomes full. Also for sanitary reasons there may be provided a germicidal lamp 21 in the area where the cup 17 is filled from faucet 19.

The illustrative embodiment of the invention as herein shown and described dispenses carbonated water and syrup or flavor into the waiting cup 17 by means of $CO_2$ pressure maintained on the several syrup supply tanks and carbonated water sources, and suitable means are provided for opening and timing the opened period of valves for the syrup and water in order to dispense the selected flavor, or mixture of flavors, in a drink of substantially uniform size, as selected by the customer. The machine is thus of the general type disclosed in the patent to Bowman No. 2,462,019, and the copending application of Parks No. 32,878 filed June 14, 1948, now Patent No. 2,565,084, issued August 21, 1951.

As shown in Fig. 1, three different syrups are retained in syrup supply containers 25, 26 and 27, and exit of syrup therefrom takes place through conduits 28, 29 and 30, respectively, to a cast cooler carbonator unit 31 under control of solenoid controlled valves 32, 33 and 34 respectively. After passing through the unit 31, the conduits 28, 29 and 30 are directed to the faucet 19, where the syrup from each conduit is adapted to be individually and separately directed into the streams of carbonated water from the faucet and the ingredients then falling into cup 17. Said syrup outlets at faucet 19 from conduits 28, 29 and 30 are designated 35, 36 and 37 respectively in the drawings.

A source of $CO_2$ gas under pressure is provided by means of the cylinder 40, and the exit of gas therefrom takes place through a pressure reducing valve 41 and then through two conduits 42 and 43, the former of which is provided with a pressure reducing valve 44 and is directed by suitable branches into the tops of syrup supply tanks 25, 26 and 27 to provide the desired gas pressure therein. The second $CO_2$ gas conduit 43 is directed to the carbonator 45 which, together with the aluminum casting 46 within which are cast the syrup, water and refrigerant conduits, comprises the essential elements of cooler-carbonator unit 31. The cooler-carbonator unit herein diagrammatically shown is of the type disclosed in detail in the copending application of Parks No. 785,097 filed November 10, 1947, now Patent No. 2,612,357, issued September 30, 1952.

The carbonator 45 is supplied with sweet water from a source such as a city water line or the like through conduit 48 and solenoid controlled valve 49, a pump 50 furnishing the water under pressure to the carbonator, said pump being automatically controlled by the level of water in the carbonator, which control is hereinafter described. A refrigeration unit 51 is also provided having refrigerant line 52 passing through casting 46 to refrigerate the syrups, water and carbonator, and the refrigeration unit is under the control of thermostat 53 in the cast aluminum block.

Carbonated water from carbonator 45 is drawn out under pressure through conduit 55, and the conduit is then branched into conduits 56 and 57 each of which, as shown, is provided with its own solenoid controlled valve 58 and 59 respectively, and leads to the drink dispensing faucet 19.

As will hereinafter be described in detail, the control of the various elements of the embodied machine is such that when the button 11 for flavor A is pushed by the customer after insertion of the coin in aperture 13, the cup 17 is dispensed and valve 32 for syrup in supply container 25 is opened. There is also opened at the same time valve 58 in carbonated water line 56, so that carbonated water and syrup A may flow for the duration of a given period of time into the cup, providing a mixed drink of desired and predetermined size. Similarly, if the button 11 for flavor B is pressed, valves 33 and 58 are opened to dispense a mixed drink B into the cup 17. If button 11 for flavor C is pushed, valve 34 for syrup supply is opened, and valve 59 for carbonated water to mix therewith. It will therefore be apparent that two source lines of carbonated water have been provided through conduits 56 and 57 for the faucet 19, each to be controlled through suitable mechanism in the machine for dispensing water with respective ones of the syrups held in the machine. In the machine as herein illustratively shown it may be assumed by way of example that flavors A and B are such that a relatively low degree of carbonation in the water for the beverage is desired as, for instance, if such flavors were a fruit flavor and root beer; and that flavor C is such that higher carbonation is desirable if, for instance, the flavor is a cola drink.

The faucet 19 is adapted to dispense carbonated water from each of the conduits 56 and 57 to a common outlet for mixing with syrup from one of the outlets 35, 36 or 37, but the water is conducted through individual paths to such outlet which serve to preserve, with different degrees of effectiveness the original carbonation of the water as it is supplied to the faucet assembly. Thus, carbonated water supplied to the common water outlet of the faucet will be of different degrees or points of carbonation, and in the exemplary operation herein given, water directed to the faucet through conduit 56 will be at a relatively low point of carbonation when finally dispensed, while water entering from conduit 57 will be dispensed at a relatively high degree of carbonation.

The embodied faucet means for thus dispensing carbonated water at varying degrees of carbonation for selective mixing with the several flavor syrups are illustratively shown in Figs. 3 to 7 inclusive of the drawings. As there shown the faucet comprises an L-shaped bracket plate 60 which is suitably secured to some stationary portion of the vending machine, and is adapted to hold in place the various syrup conduits 28, 29, 30 and carbonated water conduits 56 and 57 leading to the faucet, as well as other elements of the faucet assembly. The carbonated water dispensing element of the faucet comprises the central assembly 62 wherein individual paths for water from conduits 56 and 57 are provided, with common outlet 63, and about the assembly 62 are grouped the syrup outlets 35, 36 and 37 directed toward the water stream from the assembly, so that syrup and carbonated water are mixed during and after they fall into a cup 17.

The carbonated water faucet assembly 62 comprises the internal tubular element 65 having enlarged head portion 66 providing an annular shoulder 67, and the central bore 68 of said element forms a conduit for carbonated water from conduit 56 leading into head portion 66 as shown, to outlet 63 of the assembly. An external tubular element 69 is adapted to be positioned over element 65 from the lower end thereof and seat against shoulder 67, the parts being removably held in such assembled relationship by means of wing pin 70 which is positioned in suitable apertures in a lower extension 71 of internal element 65 and engages the lower end of external element 69.

As clearly shown in Fig. 5, the internal and external elements of the carbonated water faucet assembly are so proportioned that a restricted annular path or conduit is provided between the water conduit 57 and the outlet 63, said path comprising the annular chamber 72 arranged at the inlet of conduit 57, and the more restricted annular chamber 73 at the lower end of the assembly. A preferably flexible O ring 74 is positioned in a suitable groove in the exterior surface of element 65 in chamber 72 above the inlet of conduit 57 thus sealing that end of the assembly against escape of carbonated water or gas.

The assembly for discharge of carbonated water is completed by the faucet end member 75 having water outlet 63 therein, and said member is threadedly engaged with the lower end of external faucet element 69, and internally shouldered to support a wire screen 76 whereby steel wool 77 or the like may be positioned to break up the flow of carbonated water from the assembly. With the construction shown and described it will be apparent that carbonated water entering the faucet through conduit 56 passes to the outlet 63 through relatively large bore 68, and therein a certain amount of carbonation will be lost due to drop of pressure and consequent escape of gas from mixture with the water. Water entering the assembly through conduit 57, on the other hand, passes through the restricted passage formed by chambers 72 and 73, and little or no loss of pressure is permitted until just before the water is discharged into the waiting cup. There is thus achieved the high degree of carbonation in the drink receiving its water from conduit 57, and the relatively lower degree of carbonation in the drink receiving water from conduit 56. As an example of proportions which have been successful in a beverage vending machine embodying the present invention, it has been found that with carbonated water from the carbonator 45 under about 100 to 115 lbs. per square inch pressure, a clearance or distance of about .003 of an inch between the inner and outer faucet elements at annular chamber 73 will give the desired high point or degree of carbonation in the water for the finished drink.

The control circuit and mechanism for the beverage vending machine of the invention is shown in detail in Fig. 2 of the drawings. As there shown the main lead lines 80, 81 are provided as power for the machine connected through main switch 82 to any suitable source (not shown). The carbonator 45 is diagrammatically shown with short and long electrodes 86 and 87 respectively for automatically controlling water level in the chamber by means of pump 50 and solenoid controlled valve 49. In the condition shown in Fig. 2, pump 50 is in operation connected to leads 80 and 81, and valve 49 is also connected to the leads and is open. As water is supplied to the carbonator chamber, the short electrode 86 will be contacted, and at that time the secondary circuit of transformer 83 is closed, which actuates relay 84, throwing switch 85 to disconnect pump 50 and valve 49, and connects the long electrode 87 in parallel with the short electrode 86. As water is drawn from the carbonator, the long electrode 87 becomes uncovered, the secondary circuit of transformer 83 is broken, relay 84 is deenergized with switch 85 returning to the position shown in Fig. 2. Pump 50 thereupon begins operation again, valve 49 is opened, and the long electrode 87 is disconnected from the circuit.

Turning now to customer operation of the machine by depositing a coin and making a drink selection, the insertion of a coin through aperture 13 directs the coin through chute 88 to close switch 90 in its path of travel. It is assumed that anti jack pot relay 91 is set as shown for normal operation of the machine. The closing of switch 90 energizes relay 92, which sets up the holding circuit of the relay and energizes cup dispenser motor 93. Motor 93 then operates to drop the lowermost cup from the cup dispenser 16, and at the same time cam 95 is rotated a short distance to close momentarily switch 94, which energizes relay 96 thereby energizing the entire drink selector and dispensing circuit and its own holding circuit.

As cam 95 continues to turn, it engages arm 97 of switch 98. Switches 98 and 99, as diagrammatically shown, are mechanically interconnected for simultaneous snap action to the opposite position shown in Fig. 2, and automatic return to said position. Movement of switch 99 by operation of cam 95 upon arm 97 breaks the circuit to relay 92, which then returns to its original position as shown in Fig. 2. Switch 98, when so actuated, maintains the circuit to dispenser motor 93 until cam 95 clears arm 97, at which time the circuit to motor 93 is opened and the cup dispensing operation is completed.

As relay 92 was energized as described, solenoids 100 and 101 were energized, whereby counter 14 is actuated, and shaft 103 in the selector button assembly 102 is raised to clear the mechanical lock-in mechanism, so that any selector button 11 pushed in during the previous drink dispensing operation will be released. As relay 96 is actuated as has been described, the circuit to solenoids 100 and 101 is broken. The actuation of relay 96 energizes the select flavor and drink dispensing circuit which comprises the leads 104 and 105. Light 106 is positioned behind selector buttons 11 which are preferably of translucent material, and the light is turned on when the circuit just mentioned comprising leads 104 and 105 is energized, serving as a visual indication to the customer that the machine is in condition for making a drink selection by pushing a selector button.

The timer hold relay 107 is energized with the circuit including leads 104, 105, and this in turn energizes interlock relay 108. The machine is now in condition for customer selection of a beverage and the dispensing thereof, and the customer may, for instance, press in the button 11 for the flavor A, being the uppermost button of assembly 102. As diagrammatically shown in Fig. 2, the button depresses its shaft 120 and detent 121 maintains the shaft in such depressed condition by engagement with shaft 103 until the latter is raised by solenoid 101 after the next coin deposit. Double pole switch 111 is actuated by shaft 120 connected thereto, and as a consequence thereof the energizing circuit for relay 107 is broken and it returns to its normal position shown in Fig. 2, the contacts in this position starting operation of timing motor 110. Actuation of switch 111 has also energized the circuits to solenoid operated syrup valve 32 and the carbonated water valve 58, opening these valves. The drink of flavor A comprising syrup and carbonated water is then dispensed through faucet 19 into the waiting cup 17 by $CO_2$ pressure on the syrup container and carbonator, and it will be appreciated that the drink dispensed will contain carbonated water having the relatively lower degree of carbonation, since conduit 56 has been opened for water dispensing through the inner element 65 of the faucet assembly.

During dispensing of the drink as described the cam 112 is being driven in rotary motion by motor 110, and in the course of its motion it engages knock-out switch 113, momentarily opening it and breaking the entire circuit through relay 96. This deenergizes the interlock relay 108, deenergizes the flavor selection and drink dispensing circuit including leads 104, 105, and the entire machine is then returned to its normal or at rest position, in condition to receive another coin and have the described operation repeated.

It will thus be seen that the machine of the invention has automatically dispensed a drink of flavor A having the desired point or degree of carbonation, and that the drink is of a desired predetermined size or quantity, due to the substantially constant pressure dispensing of the syrup and carbonated water through fixed orifices for a timed period. It will be apparent that the customer could alternatively have pressed button 11 for flavor B and, in the illustrative machine having the control circuit shown in Fig. 2, switch 125 would have been closed, to open syrup valve 33, carbonated water valve 58, and a drink of flavor B also having a relatively low degree of carbonation would be received. Had button 11 for flavor C been alternatively depressed, such condition being illustratively shown in Fig. 2, switch 126 would be thrown, syrup valve 34 and the other carbonated water valve 59 opened. The carbonated water for this drink would thus enter the faucet assembly through conduit 57 and follow the restricted path through chambers 72 and 73, providing the finished drink of flavor C with water of a relatively high degree of carbonation, as has been described. The drinks of flavors B and C will likewise be of predetermined size based upon the factors considered in connection with flavor A, and the machine will preferably be adjusted for commercial operation so that all of the drinks dispensed therefrom are of substantially the same size, so that each customer gets about the same quantity of beverage whatever his flavor choice.

Two or more flavors can be mixed in the machine of the invention, allowing the customer to obtain a final drink of any desired mixture and proportions of flavors A, B and C. To illustrate, the customer might first push the lower button 11 for flavor C which might, for example, be a cola drink, and the drink begins to be dispensed immediately from faucet 19. During the timed cycle controlled by motor 110, which the customer may judge by watching the filling of cup 17, he may make another flavor selection, as for instance by pushing the top button 11 for flavor A. The result is that shaft 103 is raised by detent 121 of shaft 120 for flavor A, and shaft 120 for flavor C is allowed to return to its original position by release of its detent 121. Switch 111 is thus actuated as switch 126 is allowed to return to its original condition, and consequently valves 34 and 59 which have been dispensing drink of flavor C are closed, and valves 32 and 58 are opened to dispense drink of flavor A for the balance of the timed cycle of motor 110, unless of course there is further flavor change by the customer during the cycle. Flavor A might, for instance, be a fruit flavor such as lime, and it will be noted that not only has the customer been afforded the opportunity of mixing a lime cola drink in the syrup proportions he desires, dispensed as a drink of substantially the same size as any of the individual drinks, but the point or degree of carbonation for the water going into the drink will be that which is most desirable for the particular flavors mixed, and the amount of water of desired carbonation is proportionate to the amount of syrup used to which it is best adapted.

Returning now to the control circuit and mechanism shown in Fig. 2 of the drawings, it will be seen that the circuit including switches 111, 125 and 126 is a so-called cascade circuit, so that if two buttons 11 are pushed in at the same time by a customer, the upper button of the plurality pushed takes precedence to establish the operating circuit to the syrup and carbonated water solenoid valves, so that only one flavor beverage is dispensed and thus the upper of those located on the button assembly 102.

The cup dispensing mechanism 16 is of a now conventional type which comprises a plurality of stacks of cups, a new stack being turned to dispensing position as the one in position is exhausted. Thus, when the cup level drops below arm 115, the arm is allowed to raise completing the circuit to motor 116, which rotates the reserve stacks until the next is in position to vend cups, the new stack automatically resetting arm 115 to stop motor 116.

The anti jack pot relay 91 is actuated to open the main feed circuit and light the indicator light 15 when the machine, for any of several reasons, is not in condition for further operation. Thus, when drip can 20 becomes too full, switch 118 is closed to actuate the relay, and the same result occurs if the cup dispenser 16 is substantially exhausted of cups and arm 119 is allowed to rise. If the sequence of operation of relays 92 and 96 in relation to operation of switch 113 by cam 112 is not maintained for proper functioning of the machine in the way described, relay 91 is also actuated to prevent unintended dispensing of fluids. After the particular condition in the machine has been rectified, relay 91 may be reset by hand.

The invention in its broader aspects is not limited to the specific mechanisms shown and described but departures may be made therefrom, within the scope of the accompanying claims, without departing from the principles of the invention and without sacrificing its chief advantages.

What I claim is:

1. In a beverage vending machine of the type described, control means to be actuated by a customer in dispensing a drink, means actuated by said control means for dispensing selected ones of a plurality of syrups, means also actuated by said control means for dispensing carbonated water of different degrees of carbonation, said means including a dispensing nozzle having concentric, telescopically arranged, annular elements defining individual fluid conduits of different water-carrying capacity for carbonated water, and means interconnecting said control means with said syrup dispensing means and said water dispensing means for dispensing carbonated water of a predetermined one of said different degrees of carbonation with each of said plurality of syrups.

2. In a beverage vending machine of the type described, a plurality of means each for dispensing a selected one of a plurality of syrups, a plurality of means each for dispensing carbonated water of a different degree of carbonation, said means including a dispensing nozzle having a plurality of closely adjacent fluid conduits therein of different water-carrying capacity for carbonated water and valve means for admitting and restricting carbonated water through said conduits, and means for selectively dispensing a drink comprising a mixture of syrup and carbonated water including an individual element to be actuated by a customer for each drink to be dispensed, and control means for dispensing carbonated water of a predetermined one of said different degrees of carbonation through respective ones of said conduits for each syrup in a drink comprising individual operative connections between each of said elements and a means for dispensing syrup and a means for dispensing water.

3. In a beverage vending machine of the type described, a plurality of means each for dispensing a single one of a plurality of syrups, a plurality of means each for dispensing carbonated water of a different degree of carbonation, said means including a dispensing nozzle having a plurality of closely adjacent fluid conduits of different water-carrying capacity for carbonated water, means for selectively dispensing a drink comprising a mixture of one or more of said syrups and carbonated water said means including a plurality of elements to be selectively actuated by a customer in dispensing a drink, and control means for dispensing carbonated water of a predetermined one of said different degrees of carbonation through respective ones of said conduits for each syrup in a drink proportionately to the amount of each syrup in said drink, said means comprising an individual operative connection between each said element and a means for dispensing syrup and a means for dispensing carbonated water.

4. In a beverage vending machine of the type described, a dispensing faucet including concentric, telescopically arranged conduits of different water-carrying capacity for dispensing carbonated water of different degrees of carbonation, a carbonator connected to the faucet, means for dispensing selected ones of a plurality of syrups from the faucet including syrup conduits at said faucet, syrup supply containers, and gas pressure supply conduits for said carbonator and said syrup containers, and means for selectively dispensing a drink comprising a mixture of syrup and carbonated water at said faucet, said means comprising an individual element to be actuated by the customer for each drink dispensed connected to release syrup and water under gas pressure and control means for dispensing carbonated water of a predetermined one of said different degrees of carbonation for each syrup in a drink comprising an individual valve for each syrup and water conduit and individual operative connections between each element and a syrup and water valve.

5. In a beverage vending machine of the type described, a dispensing nozzle having a plurality of concentric passages for water therethrough said passages being of different water carrying capacity, a carbonator connected to said water passages in said nozzle whereby carbonated water is dispensed from said carbonator through respective ones of said passages at different degrees of carbonation, means for dispensing selected ones of a plurality of syrups adjacent said nozzle, means for selectively dispensing a drink comprising a mixture of syrup and carbonated water, and control means for dispensing carbonated water through a predetermined one of said water passages in said nozzle for each syrup in a drink.

6. Faucet means for a beverage vending machine comprising, in combination, inner and outer straight annular elements concentrically arranged with the inner walls of the outer element spaced about .003 inch from the outer wall of the inner element forming an annular conduit between said walls, said inner element defining an inner conduit, said conduits being non-communicating with each other and having outlets adjacent each other, and separate water inlet ports one for the central bore of said inner element and another for said annular conduit.

7. Faucet means for a beverage vending machine comprising, in combination, means defining a substantially cylindrical, straight inner conduit and means defining a straight, annular, outer conduit surrounding said inner conduit and concentric therewith, said outer conduit having a distance between its adjacent side walls of between .002 and .004 inch, said conduits being non-communicating with each other and having outlets adjacent each other, and separate water inlet ports one for the inner conduit and another for the outer conduit communicating with said conduits at places spaced along the lengths thereof from said outlets.

8. In a beverage vending machine of the type described, separate conduits for a plurality of syrups and a plurality of separate conduits for carbonated water, nozzle means including the outlets of said carbonated water conduits, the outlets of said syrup conduits being positioned closely adjacent to said nozzle means, said carbonated water conduits being of different water carrying capacity in said nozzle means adjacent their respective outlets, a carbonator connected to said water conduits whereby carbonated water is dispensed from said carbonator through said nozzle means at different degrees of carbonation from said outlets of said conduits for carbonated water, a syrup reservoir connected to each syrup conduit, a valve in each of said conduits, and control means for selectively dispensing drinks comprising a single syrup and carbonated water from one of said carbonated water conduits, said means including a separate element to be actuated by the customer for each such drink desired, and means interconnecting each said element with a valve in a syrup conduit and a valve in a carbonated water conduit for opening said valves by actuation of said element.

9. In a beverage vending machine of the type described, separate conduits for a plurality of syrups and a plurality of separate conduits for carbonated water, nozzle means including the outlets of said carbonated water conduits, the outlets of said syrup conduits being positioned closely adjacent to said nozzle means, said carbonated water conduits being of different water carrying capacity in said nozzle means adjacent their respective outlets, a carbonator connected to said water conduits whereby carbonated water is dispensed from said carbonator through said nozzle means at different degrees of carbonation from said outlets of said conduits for carbonated water, a syrup reservoir connected to each syrup conduit, a valve in each of said conduits, a power means for operating each of said valves, and control means for selectively dispensing drinks comprising a single syrup and carbonated water from one of said carbonated water conduits, said means including a separate element to be actuated by the customer for each drink desired, and circuit means interconnecting each said element with a power means for a valve in a syrup conduit and a power means for a valve in a carbonated water conduit for opening said valves by actuation of said element.

10. In a beverage vending machine of the type described, a plurality of conduits for syrup, a plurality of conduits for carbonated water, said last conduits being adapted to discharge carbonated water of different degrees of carbonation, a nozzle containing the terminal lengths and outlets of said carbonated water conduits wherein said conduits are concentrically and telescopically arranged with said conduits having different water-carrying capacity, a valve in each of said conduits, and control means for selectively dispensing drinks comprising a single syrup and carbonated water from one of said conduits, said means comprising a separate element to be actuated by the customer for each drink desired, and means operatively interconnecting each said element with a valve in a syrup conduit and a valve in a carbonated water conduit.

11. In a beverage vending machine of the type described, a plurality of conduits for syrup, a plurality of conduits for carbonated water, said last conduits being adapted to discharge carbonated water of different degrees of carbonation, a nozzle containing the terminal lengths and outlets of said carbonated water conduits wherein said conduits are closely adjacent to each other with said conduits having different water-carrying capacity, a valve in each of said conduits, and control means for selectively dispensing drinks comprising a single syrup and carbonated water from one of said conduits, said means comprising a separate element to be actuated by the customer for each drink desired, and means operatively interconnecting each said element with a valve in a syrup conduit and a valve in a carbonated water conduit.

References Cited in the file of this patent

UNITED STATES PATENTS

| Number | Name | Date |
| --- | --- | --- |
| 320,461 | Cowen | June 23, 1885 |
| 1,575,671 | Banes | Mar. 9, 1926 |
| 1,595,212 | Murray | Aug. 10, 1926 |
| 1,956,143 | Brown | Apr. 24, 1934 |
| 2,462,019 | Bowman | Feb. 15, 1949 |